US008854918B2

(12) United States Patent
Toennessen

(10) Patent No.: US 8,854,918 B2
(45) Date of Patent: Oct. 7, 2014

(54) MARINE SEISMIC STREAMER STEERING APPARATUS

(75) Inventor: Rune Toennessen, Oslo (NO)

(73) Assignee: WesternGeco L.L.C., Houston, TX (US)

(*) Notice: Subject to any disclaimer, the term of this patent is extended or adjusted under 35 U.S.C. 154(b) by 799 days.

(21) Appl. No.: 12/172,061

(22) Filed: Jul. 11, 2008

(65) Prior Publication Data
US 2009/0092004 A1 Apr. 9, 2009

Related U.S. Application Data

(60) Provisional application No. 60/977,575, filed on Oct. 4, 2007.

(51) Int. Cl.
G01V 1/38 (2006.01)
B63B 21/66 (2006.01)

(52) U.S. Cl.
CPC .............. G01V 1/3826 (2013.01); B63B 21/66 (2013.01); G01V 1/38 (2013.01)
USPC .................................. 367/17; 114/246; 367/16

(58) Field of Classification Search
USPC .............................. 367/17, 16; 114/244–246
See application file for complete search history.

(56) References Cited

U.S. PATENT DOCUMENTS

| | | | | |
|---|---|---|---|---|
| 4,215,862 A | * | 8/1980 | Yoshikawa et al. | 273/350 |
| 5,402,745 A | * | 4/1995 | Wood | 114/244 |
| 5,443,027 A | * | 8/1995 | Owsley et al. | 114/244 |
| 5,529,011 A | * | 6/1996 | Williams, Jr. | 114/245 |
| 6,011,752 A | * | 1/2000 | Ambs et al. | 367/17 |
| 6,671,223 B2 | | 12/2003 | Bittleston | |
| 6,932,017 B1 | | 8/2005 | Hillesund et al. | |
| 7,080,607 B2 | | 7/2006 | Hillesund et al. | |
| 7,092,315 B2 | * | 8/2006 | Olivier | 367/17 |
| 7,162,967 B2 | | 1/2007 | Hillesund et al. | |
| 7,222,579 B2 | | 5/2007 | Hillesund et al. | |
| 7,293,520 B2 | | 11/2007 | Hillesund et al. | |
| 7,469,652 B2 | * | 12/2008 | Kristiansen et al. | 114/245 |
| 2003/0039170 A1 | * | 2/2003 | Soreau et al. | 367/17 |
| 2005/0078554 A1 | | 4/2005 | Bittleston | |
| 2005/0209783 A1 | * | 9/2005 | Bittleston | 702/14 |
| 2007/0041272 A1 | | 2/2007 | Hillesund et al. | |

FOREIGN PATENT DOCUMENTS

EP 1600795 A 11/2005

OTHER PUBLICATIONS

Sercel, Nautilus Specifications, Brochure, Mar. 2008, France.
PCT Search Report, dated Feb. 2, 2010 for Application No. PCT/US2008/072780.

* cited by examiner

Primary Examiner — Ian J Lobo

(57) ABSTRACT

Marine seismic streamer steering apparatus are described having an elongate body, at least a portion of which is positioned eccentric of a marine seismic streamer, the apparatus having stability features selected from: one or more lateral steering control surfaces providing a center of lift approximately through a vertical streamer axis; one or more buoyancy elements providing a center of buoyancy through the same or a different vertical axis approximately through the center of the streamer; and combinations thereof. The apparatus have improved stability and avoid heeling during use.

18 Claims, 4 Drawing Sheets

MARINE SEISMIC STREAMER STEERING
APPARATUS

CROSS-REFERENCE TO RELATED
APPLICATION

This application claims the benefit of U.S. Provisional Patent Application Ser. No. 60/977,575 filed Oct. 4, 2007, which is incorporated herein by reference in its entirety.

BACKGROUND OF THE INVENTION

1. Field of the Invention

This invention relates generally to apparatus and methods for acquiring marine seismic data acquisition, and more particularly to marine seismic streamer positioning apparatus and methods of making and using same.

2. Related Art

Marine seismic exploration investigates and maps the structure and character of subsurface geological formations underlying a body of water. For large survey areas, seismic vessels tow one or more seismic sources and multiple seismic streamer cables through the water. The streamers may be positioned using controllable steerable birds, deflectors, steerable buoys, and the like.

Despite their wide use, some steerable birds may suffer from instability. Steerable birds comprising a body eccentric to the streamer with control surfaces attached to the eccentric body, unless very accurately ballasted to be perfectly neutrally buoyant, may tend to heel (list to one side) during use. This heeling will cause instability in the sense that a desired side force will always result in a vertical force component as well. Another factor of instability is the fact that the wings are attached to a body eccentric to the streamer and in such a way that the center of the lift force is eccentric from the streamer axis. This may result in the bird having different stability properties depending on the bird pulling (wing lift force acting away from the streamer) or pushing (wing lift force acting towards the streamer) on the streamer.

It would be an advance in the art if the stability of steerable birds comprising an eccentric body could be improved.

SUMMARY OF THE INVENTION

In accordance with the present invention, marine seismic streamer steering apparatus are described, which overcome at least some of the instability problems encountered in known streamer positioning devices. Apparatus of the invention may be used to collect data in towed streamer marine seismic surveys, for example 3D and 4D towed streamer marine seismic surveys.

Streamer steering apparatus of the invention comprise an elongate body positioned eccentric of a marine seismic streamer, the apparatus having stability features selected from: one or more lateral steering control surfaces providing a center of lift approximately through the center of the streamer; one or more buoyancy elements providing a center of buoyancy approximately on a vertical axis through the center of the streamer; and combinations thereof. In certain embodiments, the one or more lateral steering control surfaces may provide a center of lift may be through the center of the streamer. In certain embodiments, the one or more buoyancy elements may provide a center of buoyancy on the vertical axis through the center of the streamer.

A first apparatus embodiment within the invention comprises an elongate body portion, at least a portion of the body having a longitudinal axis adapted to be substantially eccentric and generally horizontal with a longitudinal axis of a seismic streamer when attached thereto, the elongate body portion having removably attached thereto one or more control surfaces having shape and composition such that a center of lift of the control surfaces goes through the streamer and is substantially vertical. Apparatus within this embodiment include those wherein the one or more control surfaces are independently controllable. The control surfaces may be wings, hydrofoils, or some other surface able to provide lift in a lateral direction. At least a portion of each control surface may be aligned with a vertical line through the streamer. The control surfaces may comprise a first portion having an end connected to the eccentric body, and another end connected to a second portion at an inflection point, the second portion being substantially vertical. The inflection point may define a vertex of an angle between the first portion and second portion of the control surfaces. Alternatively, the inflection point may be undefined and exist somewhere on a curve between the first portion and the second portion. The first and second portions may move independently of the first portions in some embodiments, for example through provision of appropriate gears or other means.

A second apparatus embodiment of the invention comprises an elongate body portion, at least a portion of the body having a longitudinal axis adapted to be substantially eccentric and generally horizontal with a longitudinal axis of a seismic streamer when attached thereto, the elongate body portion having removably attached thereto two or more generally vertical control surfaces such that a center of lift of the control surfaces is not through the streamer, each comprising a buoyancy element at their distal ends, the upper control surface buoyancy element comprising a positively buoyant element, the lower control surface buoyancy element comprising a negatively buoyant element (ballast element). The two control surfaces may comprise upper and lower wings.

A third apparatus embodiment of the invention comprises an elongate body portion, at least a portion of the body having a longitudinal axis adapted to be substantially eccentric and generally horizontal with a longitudinal axis of a seismic streamer when attached thereto, the elongate body portion having removably attached thereto two or more generally vertical control surfaces such that a center of lift of the control surfaces is not through the streamer, the eccentric body including a yoke extending generally horizontally toward the streamer and to which are attached a generally vertical upper extension member and a generally vertical lower extension member, the upper vertical extension member including a positive buoyancy element at its distal end, and the lower vertical extension member including a negative buoyancy element at its distal end, the upper and lower extension members having an axis passing through the streamer. The two control surfaces may comprise upper and lower wings.

A fourth apparatus embodiment is a combination of the first and second embodiments, wherein the two control surfaces each comprise a buoyancy element at their distal ends, the upper buoyancy element comprising a positively buoyant element, the lower buoyancy element comprising a negatively buoyant element (ballast element), the control surfaces having shape and composition such that a center of lift of the control surfaces goes through the streamer and is substantially vertical. As with the first embodiment, apparatus within this embodiment include those wherein the one or more control surfaces are independently controllable. The control surfaces may be wings, hydrofoils, or some other surface able to provide lift in a lateral direction. At least a portion of each control surface may be aligned with a vertical line through the streamer. The control surfaces may comprise a first portion having an end connected to the eccentric body, and another end connected to a second portion at an inflection point, the second portion being substantially vertical. The inflection point may define a vertex of an angle between the first portion and second portion of the control surfaces. Alternatively, the inflection point may be undefined and exist somewhere on a curve between the first portion and the second portion. The first and second portions may move independently of the first portions in some embodiments, for example through provision of appropriate gears or other means.

A fifth apparatus embodiment within the invention comprises a combination of embodiments one and three, wherein the two vertical extensions are offset along the streamer from the portions of the upper and lower control surfaces that have shape and composition such that a center of lift of the control surfaces goes through the streamer and is substantially vertical.

Apparatus within the invention may have certain features in common with the previously known streamer steering apparatus known under the trade designation DigiFin, such as materials of construction, dimensions of the eccentric body, and the like, other than the inventive features described herein. Apparatus of the invention include designs where the center of buoyancy lies on a vertical axis through the center of the streamer, or alternatively, or in addition, add sufficient righting moment in terms of buoyancy and weight and in such a magnitude that this effect out weights the hydrostatic instability caused by the center of buoyancy of the original device being eccentric to the streamer axis. Also presented are designs for which the center of lift goes through the vertical streamer axis even though the wings are attached to a body eccentric to the streamer.

The invention and its benefits will be better understood with reference to the detailed description below and the accompanying figures.

Figure 1:
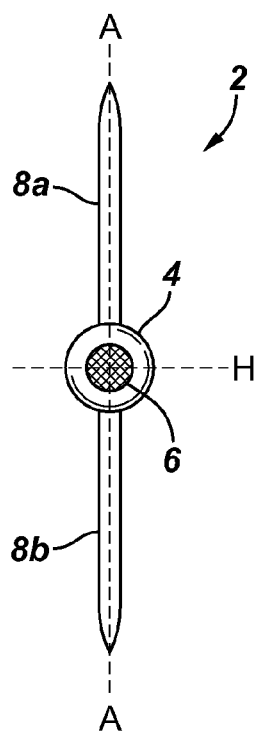
FIGS. 1-3 illustrate schematic front elevation views of three known streamer steering devices.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

A marine seismic streamer is an elongate cable-like structure, typically up to several thousand meters long, which contains arrays of seismic sensors, known as hydrophones, and associated electronic equipment along its length, and which is used in marine seismic surveying. In order to perform a 3D marine seismic survey, a plurality of such streamers are towed at about 5 knots behind a seismic survey vessel, which also tows one or more seismic sources, typically air guns. Acoustic signals produced by the seismic sources are directed down through the water into the earth beneath, where they are reflected from the various strata. The reflected signals are received by the hydrophones, and then digitized and processed to build up a representation of the subsurface geology.

The horizontal positions of the streamers are typically controlled by a deflector, located at the front end or "head" of the streamer, and a tail buoy, located at the back end or "tail" of the streamer. These devices create tension forces on the streamer which constrain the movement of the streamer and cause it to assume a roughly linear shape. Cross currents and transient forces cause the streamer to bow and undulate, thereby introducing deviations into this desired linear shape.

The streamers are typically towed at a constant depth of approximately ten meters, in order to facilitate the removal of undesired "ghost" reflections from the surface of the water. To keep the streamers at this constant depth, control devices known as "birds", are typically attached at various points along each streamer between the deflector and the tail buoy, with the spacing between the birds generally varying between 200 and 400 meters. The birds have hydrodynamic control surfaces, commonly referred to as wings, which allow the position of the streamer to be controlled as it is towed through the water. When a bird is used for depth control purposes only, it is possible for the bird to regularly sense its depth using an integrated pressure sensor and for a local controller within the bird to adjust the wing angles to maintain the streamer near the desired depth using only a desired depth value received from a central control system.

While the majority of birds used thus far have only controlled the depth of the streamers, additional benefits can be obtained by using properly controlled horizontally steerable birds, particularly by using the types of horizontally and vertically steerable birds disclosed in U.S. Pat. No. 6,671, 223. The benefits that can be obtained by using properly controlled horizontally steerable birds can include reducing horizontal out-of-position conditions that necessitate reacquiring seismic data in a particular area (i.e. in-fill shooting), reducing the chance of tangling adjacent streamers, and reducing the time required to turn the seismic acquisition vessel when ending one pass and beginning another pass during a 3D seismic survey.

It is estimated that horizontal out-of-position conditions reduce the efficiency of current 3D seismic survey operations by between 5 and 10%, depending on weather and current conditions. While incidents of tangling adjacent streamers are relatively rare, when they do occur they invariably result in prolonged vessel downtime. The loss of efficiency associated with turning the seismic survey vessel will depend in large part on the seismic survey layout, but typical estimates range from 5 to 10%. Simulations have concluded that properly controlled horizontally steerable birds can be expected to reduce these types of costs by approximately 30%.

In order to appreciate the various features of the invention, a discussion is presented first of some of the relevant features of previously known steerable birds. In the figures, the same reference numerals are used throughout to denote the same or similar components, except where noted.

FIG. 1 illustrates at 2 a front elevation view of a streamer steering device known under the trade designation Q-FIN, from WesternGeco LLC, comprising a body 4 inline with a streamer 6, and two independently movable wings, 8a, 8b attached to body 4. The axis A-A of the wings goes through the center of the streamer and is generally vertical. The horizontal axis is indicated at H.

Figure 2:
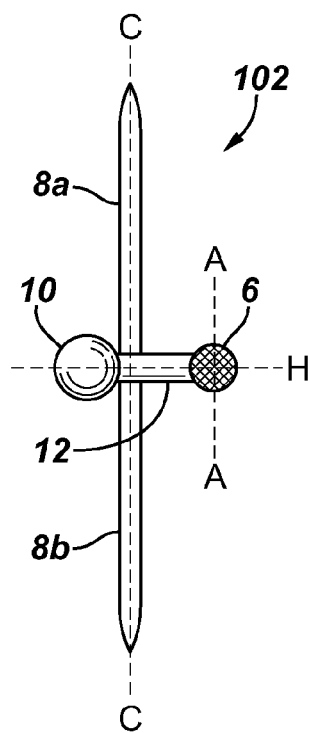

FIG. 2 illustrates at 102 a front elevation view of a streamer steering apparatus known under the trade designation Digi-Fin, from Input/Output, Stafford, Tex., and further described in their U.S. Pat. No. 7,092,315. As explained therein, the eccentric body 10 is either clamped onto the streamer, or connected to the streamer through special connectors to allow the eccentric body 10 to rotate about the streamer 6. The eccentric body 10 of this streamer steering device is intended to be orientated generally horizontal relative to streamer 6. The wings 8a and 8b may comprise one unit or two units positioned eccentric of the streamer 6 and are mounted to a wing support element 12 extending from a connector on streamer 6 to eccentric body 10. A generally vertical orientation of the wing(s) is achieved through hydrostatic stability by buoyancy in the upper part of the wing 8a and water or weight elements in the lower part of the wing 8b. The wing axis C-C, being eccentric to, and in general parallel to, a vertical axis A-A going through the center of the streamer, is a major difference between embodiments 2 and 102, and may lead to instability and heeling during use.

Figure 3:
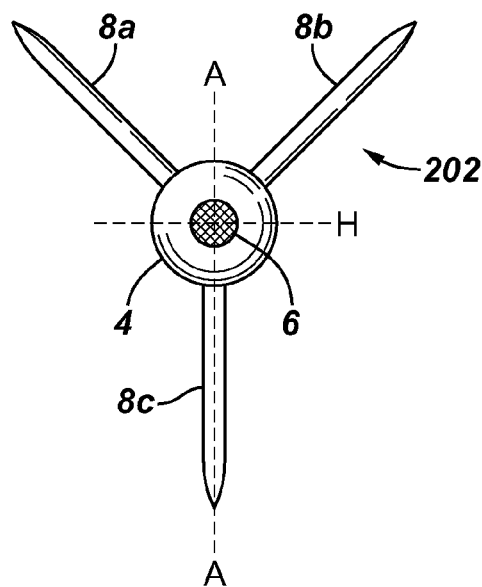

FIG. 3 illustrates yet another known streamer steering device 202, from Sercel. Seemingly it applies the same principles as the device known under the trader designation Q-FIN except that it has three control surfaces or wings 8a, 8b, and 8c extending from the body. Whether the wings are independently moveable or not is not known to the present inventor.

Figure 4A:
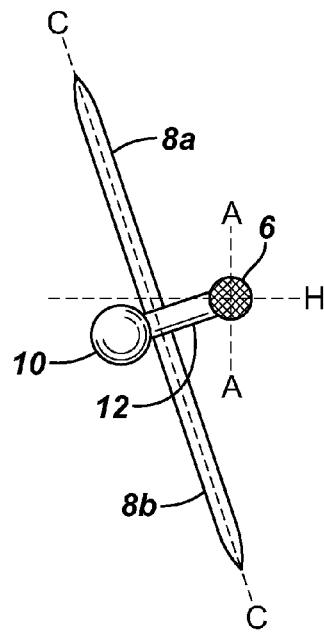
FIGS. 4-5 illustrate further schematic front elevation views of the streamer steering device of FIG. 2, illustrating potential instability problems with such a device.
Figure 4B:
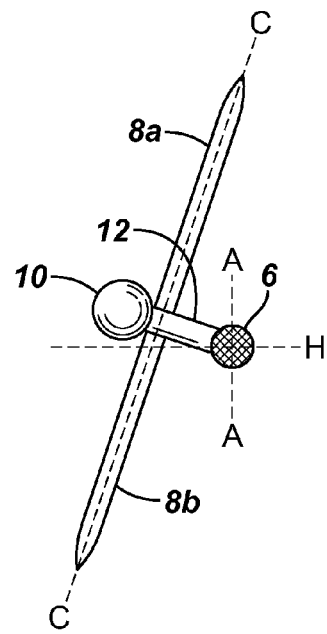
Figure 5A:
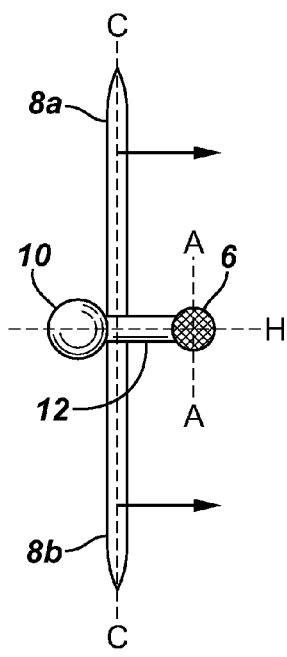
Figure 5B:
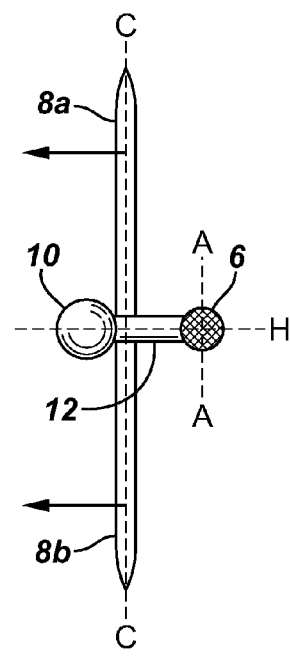

The invention focuses on methods of enhancing stability of the design of steering device 102 illustrated in FIG. 2. Before going into the detail of embodiments of the present invention, some weaknesses of steering device 102 are explained with reference to FIGS. 4A, 4B, 5A, and 5B. The fact that the center of buoyancy and the center of lift of streamer steering device 102 are eccentric to the streamer puts very tight tolerances on the net weight/buoyancy (buoyancy–weight) of the device. If the net buoyancy of the device is not equal to zero the bird may tilt as illustrated in FIGS. 4A and 4B. The fact that the lifting surfaces (wings) 8a, 8b are eccentric to streamer 6 results in a system in which stability depends on the direction of lift produced by the wings. In this context a push scenario (wing lift pushing towards the streamer, as illustrated schematically in FIG. 5A) is less stable than a pull scenario (wing lift pulling away from the streamer, as illustrated in FIG. 5B), wherein the heavy arrows in each figure represent the direction of force on the streamer.

Figure 6:
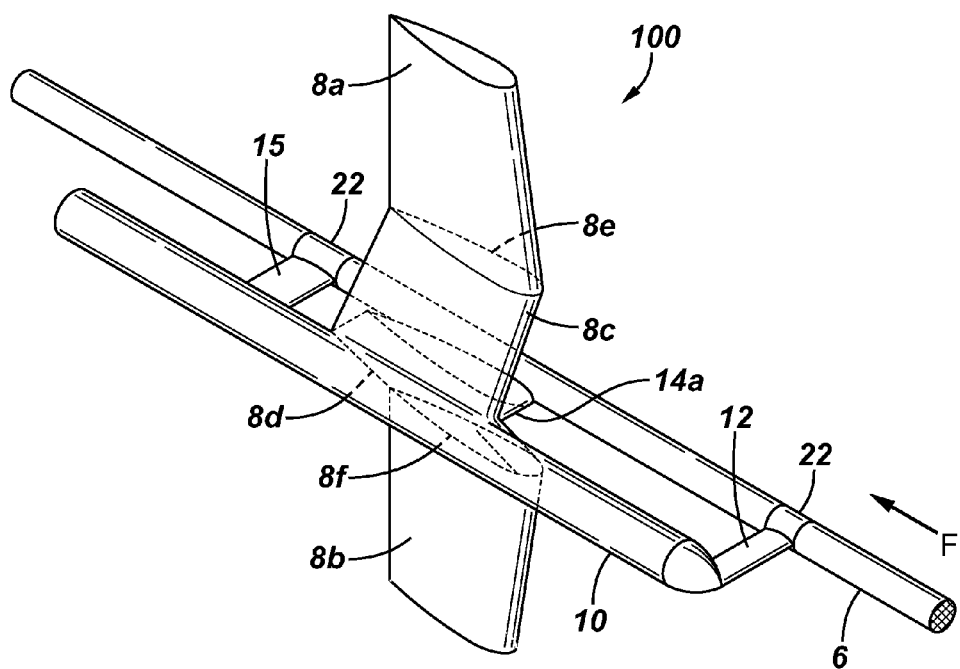
FIG. 6 is a schematic perspective view of a first embodiment of a streamer steering device in accordance with the present invention.
Figure 7:
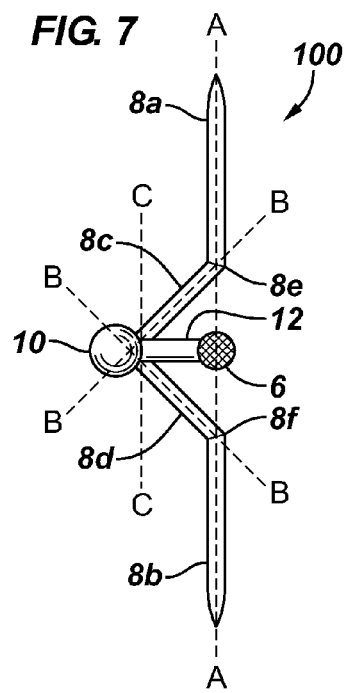
FIG. 7 is a schematic front elevation view of the streamer steering apparatus of FIG. 6.

A first streamer steering apparatus embodiment 100 of the invention is illustrated in perspective view in FIG. 6, and in front elevation view in FIG. 7. In FIG. 6 the arrow F represents the direction of flow of water. This embodiment addresses both points discussed herein in reference to FIGS. 4A, 4B, 5A, and 5B. The upper and lower control surfaces are, in embodiment 100, divided into two or more relatively straight segments 8a, 8c and 8b, 8d, in each case having a definite inflection point 8e, 8f. In other embodiments (not illustrated) the upper and lower control surfaces may be smoothly and gradually curved, without definite inflection points. Pylons 15 and 12 may extend from eccentric body 10 to streamer 6 and connect to streamer 6 via connectors 22 as described in U.S. Pat. No. 7,092,315. In any case, a major portion of each of the upper and lower control surfaces is located along a line A-A extending vertically through the center of streamer 6. The control surfaces 8a, 8c and 8b, 8d are still mounted on a portion 14a of body 10 eccentric to the streamer. The fact that the majority of the control area and volume is located along the line A-A extending vertically through the center of the streamer has at least two positive effects. First, if localizes more of the volume along line A-A extending through the center of the streamer, and hence making the bird less prone to negative effects such as tilting from un-balance in net weight (as illustrated schematically in FIGS. 4A and 4B). Second, orienting the control surfaces along the line A-A extending vertically through the center of the streamer addresses the problem illustrated in FIGS. 5A and B. The angle of attack of the wings may be adjusted by rotating the wings about their respective axis B-B (FIG. 7) not parallel to the vertical axis extending from the center of the streamer, or the angle of attack of the wings may be achieved by rotating the wings about axis C-C (FIG. 7) parallel but eccentric to the line A-A extending vertically through the center of streamer 6.

Figure 8:
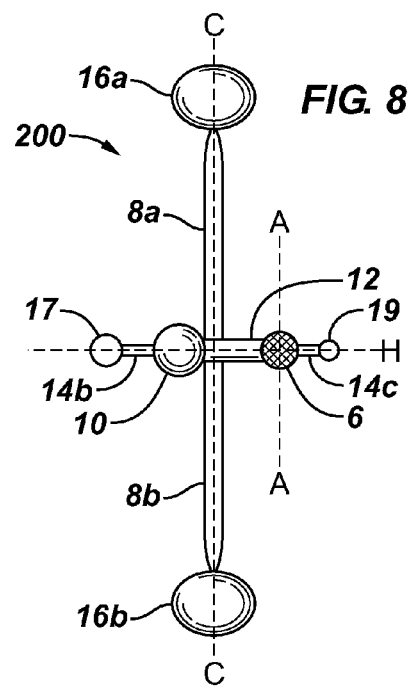
FIGS. 8-10 illustrate schematic front elevation views of three streamer steering devices within the invention.
Figure 9:
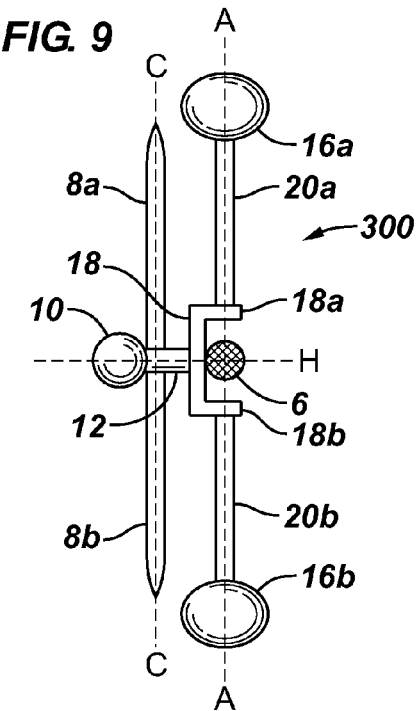

Second and third streamer steering device embodiments 200 and 300 of the invention are illustrated in FIGS. 8 and 9, respectively. In order to reduce the negative effect of non-zero net buoyancy, more hydrostatic stability may be added as illustrated in FIG. 8. In embodiment 200 a buoyancy element 16a is added to the tip of the upper half of wing 8a, and a ballast weight 16b is added to the tip of the lower half of wing 8b of embodiment 102. Further buoyancy may be added to the apparatus 200 by attaching a buoyancy element 17 using an extension 14b, and a weight 19 using an extension 14c.

Although embodiment 200 is an improvement over embodiment 102 in terms of lateral stability, more buoyancy and weight added may again lead to a larger amount of non-zero net buoyancy, and when added eccentric to the streamer some of the increase in lateral stability may be counteracted by a heeling moment from the non-zero net buoyancy times the distance to the center of the streamer. Therefore, adding the extra righting moment in a way that does not risk adding a heeling moment is beneficial. This may be achieved by adding the buoyancy element 16a and weight 16b along the vertical axis A-A through the center of streamer 6 as illustrated in embodiment 300 of FIG. 9. A yoke 18 is provided having yoke arms 18a and 18b as illustrated. Yoke arm 18a supports an extension element 20a, which in turn supports buoyancy element 16a. Yoke arm 18b supports an extension element 20b, which in turn supports weight 16b. Extensions 20a, 20b may be fixed or may have some degree of rotation; although their main function is to support the buoyancy and weight elements, they may contribute some lateral force, for example if they have a hydrofoil shape.

Figure 10:
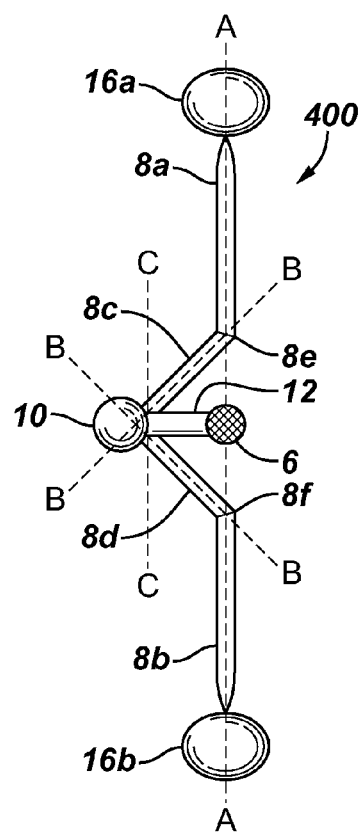

A fourth streamer steering apparatus embodiment 400 of the invention is illustrated in FIG. 10, which may be described as a combination of embodiments 100 and 200 of FIGS. 7 and 8, respectively. Embodiment 400 may or may not have the extra buoyancy element 17 and weight 19 as illustrated in FIG. 8. In embodiment 400, both the center of lift and the center of buoyancy line on vertical line A-A through the center of streamer 6. Control surfaces 8*a*, 8*c* and 8*b*, 8*d* may be curved rather than have definite inflection points, as explained previously in reference to FIG. 7.

Figure 11:
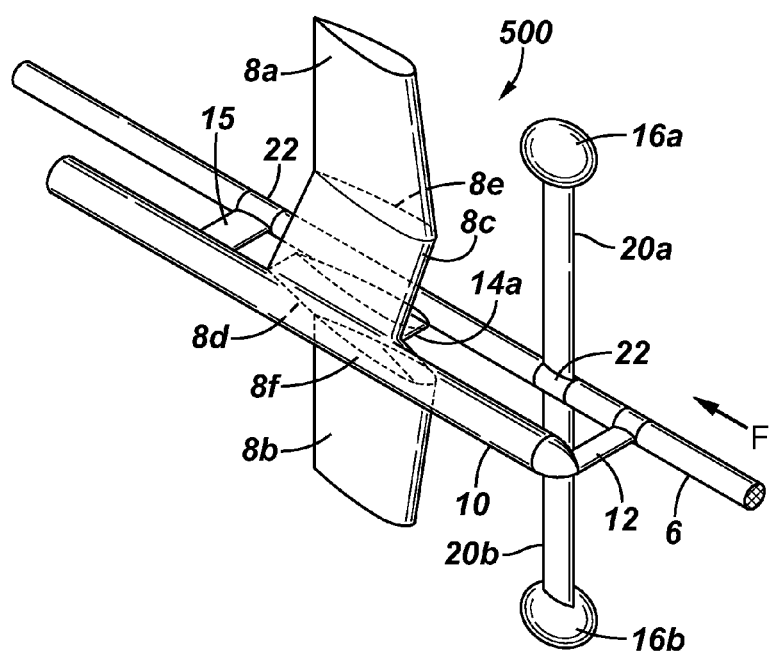
FIG. 11 is a schematic perspective view of another embodiment of a streamer steering device in accordance with the present invention.

A fifth streamer steering apparatus embodiment of the invention is illustrated in FIG. 11, which may be envisioned as a different combination of the embodiments of FIGS. 7 and 8. In this embodiment, the bent wing style 8*a*, 8*c* and 8*b*, 8*d* is used, with separate extension elements 20*a* and 20*b* extending away vertically from streamer 6 having an upper buoyancy element 16*a* and a lower weight element 16*b* at the distal ends of the extensions. Extensions 20*a*, 20*b* may be fixed or may have some degree of rotation; although their main function is to support the buoyancy and weight elements, they may contribute some lateral force, for example if they have a hydrofoil shape.

Various control systems may be useful in the invention, and since this is not a major feature of the invention, they are only briefly summarized here. The most important requirement for the control system is to prevent the streamers from tangling. This requirement becomes more and more important as the complexity and the total value of the towed equipment increases. The trend in the industry is to put more streamers on each seismic survey vessel and to decrease the horizontal separation between them. To get better control of the streamers, horizontal steering becomes necessary. If the birds are not properly controlled, horizontal steering can increase, rather than decrease, the likelihood of tangling adjacent streamers. Localized current fluctuations can dramatically influence the magnitude of the side control required to properly position the streamers. To compensate for these localized current fluctuations, the control system may utilize a distributed processing control architecture and behavior-predictive model-based control logic to properly control the streamer positioning devices.

In certain embodiments of the present invention, the control system for the apparatus may be distributed between a global control system located on or near the seismic survey vessel and a local control system located within or near the apparatus. The global control system is typically connected to the seismic survey vessel's navigation system and obtains estimates of system wide parameters, such as the vessel's towing direction and velocity and current direction and velocity, from the vessel's navigation system. The global control system may monitor the actual positions of each of the birds and may be programmed with the desired positions of or the desired minimum separations between the seismic streamers. The horizontal positions of the birds can be derived, for instance, using the types of acoustic positioning systems described in our U.S. Pat. Nos. 4,992,990 or 5,668,775, both incorporated herein by reference. Alternatively, or additionally, satellite-based global positioning system equipment can be used to determine the positions of the equipment. The vertical positions of the birds are typically monitored using pressure sensors attached to the birds, as discussed below.

The global control system may maintain a dynamic model of each of the seismic streamers and utilize the desired and actual positions of the birds to regularly calculate updated desired vertical and horizontal forces the birds should impart on the seismic streamers to move them from their actual positions to their desired positions. Because the movement of the seismic streamer causes acoustic noise (both from seawater flow past the bird wing structures as well as cross current flow across the streamer skin itself), it is important that the streamer movements be restrained and kept to the minimum correction required to properly position the streamers. Any streamer positioning device control system that consistently overestimates the type of correction required and causes the bird to overshoot its intended position introduces undesirable noise into the seismic data being acquired by the streamer. In current systems, this type of over-correction noise is often balanced against the "noise" or "smearing" caused when the seismic sensors in the streamers are displaced from their desired positions.

The global control system may calculate the desired vertical and horizontal forces based on the behavior of each streamer and also takes into account the behavior of the complete streamer array. Due to the relatively low sample rate and time delay associated with the horizontal position determination system, the global control system may run position predictor software to estimate the actual locations of each of the birds. The global control system may also check the data received from the vessel's navigation system and the data will be filled in if it is missing. The interface between the global control system and the local control system may operate with a sampling frequency of at least 0.1 Hz. The global control system will typically acquire the following parameters from the vessel's navigation system: vessel speed (m/s), vessel heading (degrees), current speed (m/s), current heading (degrees), and the location of each of the birds in the horizontal plane in a vessel fixed coordinate system. Current speed and heading may also be estimated based on the average forces acting on the streamers by the birds. The global control system may send the following values to the local bird controller: demanded vertical force, demanded horizontal force, towing velocity, and crosscurrent velocity.

The towing velocity and crosscurrent velocity are preferably "water-referenced" values that are calculated from the vessel speed and heading values and the current speed and heading values, as well as any relative movement between the seismic survey vessel and the bird (such as while the vessel is turning), to produce relative velocities of the bird with respect to the water in both the "in-line" and the "cross-line" directions. Alternatively, the global control system could provide the local control system with the horizontal velocity and water in-flow angle. The force and velocity values are delivered by the global control system as separate values for each bird on each streamer continuously during operation of the control system.

The "water-referenced" towing velocity and crosscurrent velocity could alternatively be determined using flowmeters or other types of water velocity sensors attached directly to the birds. Although these types of sensors are typically quite expensive, one advantage of this type of velocity determination system is that the sensed in-line and cross-line velocities will be inherently compensated for the speed and heading of marine currents acting on said streamer positioning device and for relative movements between the vessel and the bird.

A communication line, which may consist of a bundle of fiber optic data transmission cables and power transmission wires, passes along the length of the seismic streamer and is connected to the seismic sensors, hydrophones, that are distributed along the length of the streamer, and to the birds. The birds may have a pair of independently moveable wings that are connected to rotatable shafts that are rotated by wing motors and that allow the orientation of the wings with respect to the bird body to be changed. When the shafts of the bird are not horizontal, this rotation causes the horizontal orientation of the wings to change and thereby changes the horizontal forces that are applied to the streamer by the bird.

The motors may consist of any type of device that is capable of changing the orientation of the wings, and they are preferably either electric motors or hydraulic actuators. The local control system controls the movement of the wings by calculating a desired change in the angle of the wings and then selectively driving the motors to effectuate this change. While separate motors for each wing may be used, it would be also be possible to independently move the wings using a single motor and a selectively actuatable transmission mechanism.

When the bird uses two wings to produce the horizontal and vertical forces on the streamer, the required outputs of the local control system are relatively simple, the directions and magnitudes of the wing movements required for each of the wings, or equivalently the magnitude and direction the motors need to be driven to produce this wing movement. While the required outputs of the local control system for such a two full moving wing design is quite simple, the structure and operation of the overall system required to coordinate control of the device may be relatively complicated.

Another system for controlling a horizontally steerable bird is disclosed in the previously mentioned U.S. Pat. No. 6,671,223, incorporated herein by reference. Using this type of control system, the desired horizontal positions and the actual horizontal positions are received from a remote control system and are then used by a local control system within the birds to adjust the wing angles. The actual horizontal positions of the birds may be determined every 5 to 10 seconds and there may be a 5 second delay between the taking of measurements and the determination of actual streamer positions. While this type of system allows for more automatic adjustment of the bird wing angles, the delay period and the relatively long cycle time between position measurements prevents this type of control system from rapidly and efficiently controlling the horizontal position of the bird. A more deterministic system for controlling this type of streamer positioning device may be desired.

Deterministic control systems useful in the present invention include those described in assignee's U.S. Pat. Nos. 6,932,017 and 7,080,607, both incorporated herein by reference, and co-pending U.S. application Ser. Nos. 11/454,352; 11/454,349 and 11/455,042, all filed Jun. 16, 2006, all three of which are incorporated herein by reference. In these methods, wing motors and wing units are connected to wing position indicators that sense the relative positions of the wings and provide measurements to analog to digital conversion units which convert the analog wing position indicator measurements into digital format and convey these digital values to a central processor unit. Various types of wing position indicators may be used, including resistive angle or displacement sensors inductive sensors, capacitive sensors, hall sensors, or magneto-restrictive sensors.

A horizontal accelerometer and a vertical accelerometer, placed at right angles with respect to one another, may also be connected to the analog to digital conversion unit, and these accelerometers may convey measurements that allow the central processor unit to determine the roll angle and roll rate of the bird. An angular velocity vibrating rate gyro (rategyro) may also be used to measure the roll rate of the bird. A temperature sensor connected to the analog to digital conversion unit may provide temperature measurements that allow the horizontal accelerometer and vertical accelerometer to be calibrated. A pressure sensor may also be connected to the analog to digital conversion unit to provide the central processor unit with measurements of the water pressure at the bird. To calculate an appropriate depth value, the measured pressure values may be filtered to limit the disturbance from waves. This may be done with a weight function filter that avoids the large phase displacements caused by mean value filters. Instead of using an instantaneous depth value or simply calculating an average depth value over a given period of time (and thereby incorporating a large phase displacement into the depth value), the control system may use a differentially weighted pressure filtering scheme. First the pressure values are transformed into depth values by dividing the pressure sensor reading by the seawater density and gravitational acceleration. These depth values are then filtered using a weight function filter. Typical incremental weighting functions values range from 0.96 to 0.90 (sample weights of 1.0, 0.9, 0.81, 0.729, etc.) and the filter will typically process depth values received over a period of at least 100 seconds.

The central processor unit may be connected to a communications bus that allows information to be exchanged between the local control system and the global control system over the communication line that passes through the streamer. The bus may, for instance, utilize neuron chips that communicate using a local operating network protocol to control the data transfer. The central processor unit and associated components may comprise a very low power microprocessor, a dual UART on-chip, 12-channel, 10 bit ADC on-chip, 908×8 RAM, 16 k×16 ROM, and 50 digital I/O channels. The software running on the central processor unit may consist of two units, the local control unit and the hardware control unit. It is possible to update these program units without having to open the bird. The on-chip memory may thus only initially contain a boot-routine that enables the loading of software units into the external memory via the communication bus. The external program memory will typically be a non-volatile memory so that these program units do not have to be re-loaded after every power down. The central processor unit must be able to run the local control system software fast enough to secure the sampling frequency needed for effective local bird control. This may mean, for instance, a sample rate of 10 Hz, which may be 10 to 100 times faster than the sample rate of the communications between the global control system and the local control system. As discussed above, the central processor unit may also receive data from sensors attached to the bird. The sensed values include bird roll angle, bird roll angular velocity (roll rate), the wing angles, and the static pressure of the water. These values are typically delivered to the central processor unit at a sample rate of at least 10 Hz. The following values may be transmitted from the local control system to the global control system using the communication unit: the measured roll angle, the measured roll rate, the measured wing angles, the measured water pressure, the calculated depth, and the calculated wing forces.

The control system may have a redundant communication system to increase its overall reliability. The bird will typically have a backup communications channel, such as by overlaying a backup control signal on top of the power line current. This backup communications channel is particularly important because in the event of loss of communications to the bird there would otherwise be no method for instructing the bird to bring the streamer to surface so the defective communications equipment can be repaired or replaced.

As noted earlier, except for the inventive features related to increasing stability of the device, the inventive streamer steering apparatus may share many of the features of the device known under the trade designation DigiFin, as disclosed in U.S Pat. No. 7,092,315, incorporated herein by reference for its disclosure of the common features. For example, apparatus of the invention may include two connectors or cuffs rotatably attached to collars affixed about the periphery of a streamer. In these embodiments, races formed on the collars receive the connectors and allow them to rotate freely about the streamer. An oversized stop may be provided at the rear of the rear collar to keep the cuffs in position as the streamer is towed. Alternatively, instead of rotating about collars encircling the streamer, the connectors could rotate about insert sections placed in-line between two streamer sections. The insert sections would themselves rotatably receive the connectors in these embodiments.

Apparatus of the invention may have front and rear pylons 12, 15 that include latching hardware 22 to releasably connect the apparatus to the connectors. The pylons extend from eccentric body 10, which may be in the form of a hollow tube that houses electronic communication and control circuits, a battery, and a drive mechanism, including a motor. Wings 8a, 8b may extend from opposite sides of a wing support section of the eccentric body between the two pylons. Each wing may be mounted on opposite ends of a single shaft or on the ends of separate shafts. A drive mechanism inside the body rotates the single shaft (or the separate shafts) to pivot each wing about pivot axis A-A in embodiments 100 and 400 (FIGS. 6, 7 and 10) defined by the shafts, or axis C-C in embodiments 200 and 300, which are offset from the cable and do not intersect its longitudinal axis.

Control surfaces in accordance with the invention may be ballasted as explained in the U.S. Pat. No. 7,092,315 patent so that the pivot axes of its wings remain largely vertical, although, as explained herein, unless this is carefully done some heeling will occur. The specific gravity of the control surfaces and connectors, and pylons are designed to be about the same as that of the streamer cable itself, for example, buy making one of the control surfaces heavier than the other. This can be done, for example, by making the lower wing out of a denser material or installing a weight, such as a lead or tungsten weight, in a void within the wing. The control surfaces of apparatus within the invention may be solid and molded out of polyurethane, and the interior of one or both may be hollow with a void that is empty or filled with a foam material, such as glass-sphere-filled polyurethane or glass-sphere-filled epoxy, to keep them lightweight without affecting their designed shape. With the addition of one or more features of the present invention, apparatus of the invention are more properly ballasted and capable of steering the streamer cable to which it is attached. Other ways of maintaining stability include addition of buoyancy aide 17, or float, attached to the eccentric body 10 as an appendage via an extension 14b (FIG. 8). Float 17 lowers the specific gravity of the bird assembly. Adjusting the volume of float 17 or the length of its extension 14b adjusts the specific gravity of the apparatus to help maintain stability and avoid heeling. Adding flotation in this way can be used alone or in conjunction with adjusting the absolute and relative weights of the control surfaces and buoyancy elements 16a and 16b in embodiments 200, 300, 400, and 500 of the present invention. Optionally, a weight 19, negatively buoyant, may be attached via an extension 14c to the connector at a position on the opposite side of the streamer to right the pivot axes of the bird assembly. These ballasting means may be used to pre-adjust apparatus of the invention before deployment underwater. They are also hydrostatic in that they do not depend on the speed of the tow to be effective, as explained in the U.S. Pat. No. 7,092,315 patent. Yet another way to maintain the pivot axis of the wings vertical is to add a rudder or an aileron controlled by an aileron controller attached to the connector on the opposite side of the streamer from the cable-steering device, as illustrated in FIG. 6 of the U.S. Pat. No. 7,092,315 patent. Alternatively, the aileron could extend from the cable-steering device directly. The aileron rotates about a generally horizontal axis H similar to the wings of a cable-leveling bird and provides more or less lift to the cable-steering assembly as a function of its pitch angle of attack. But, in this version, the amount of lift depends on the speed of the streamer through the water. The aileron controller may include an orientation sensor to determine its orientation relative to vertical.

Orientation sensors, such as one or more inclinometers or accelerometers, may be used to determine the orientation. In some cases, an inclinometer alone may be sufficient. In other cases, in which cable accelerations are frequent and significant, multiple-axis accelerometers may be necessary. From the orientation sensor signals, the controller may determine the orientation of the wings. The cable is steered by adjusting the angle of attack of the control surfaces.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. A marine seismic streamer steering apparatus comprising:
    an elongate body positioned horizontally eccentric to a marine seismic streamer having a first vertical axis, wherein the elongate body has a second vertical axis different from the first vertical axis; and
    one or more lateral steering control surfaces coupled to the elongate body, each control surface comprises:
        a first portion and a second portion, wherein the first portion is disposed substantially vertical along the first vertical axis, wherein the second portion is disposed at an angle from the first portion, and wherein the second portion has a first end connected to the elongate body and a second end connected to the first portion at an inflection point.

2. The apparatus of claim 1 wherein the second vertical axis is substantially parallel to the first vertical axis when the elongate body is attached to the seismic streamer.

3. The apparatus of claim 2 wherein the control surfaces are removably attached to the apparatus.

4. The apparatus of claim 1 wherein one or more of the control surfaces are independently controllable.

5. The apparatus of claim 1 wherein the control surfaces are selected from wings, hydrofoils, or other surface able to provide lift.

6. The apparatus of claim 1 wherein the inflection point defines a vertex of the angle between the first portion and second portion of the control surfaces.

7. The apparatus of claim 1 wherein the control surfaces each comprise a smoothly curved body having an end connected to the eccentric body portion.

8. The apparatus of claim 1 further comprising one or more buoyancy elements providing a center of buoyancy approximately through the first vertical axis through the center of the streamer.

9. The apparatus of claim 1 wherein the lateral steering control surfaces provide a center lift approximately through the first vertical axis.

10. A marine seismic streamer steering apparatus comprising:
an elongate body portion positioned eccentric to a seismic streamer;
two or more substantially vertical control surfaces removably coupled to the elongate body portion such that a center of lift of the control surfaces is not through a vertical axis of the seismic streamer;
a yoke coupled to the elongate body portion, wherein the yoke extends substantially horizontally toward the seismic streamer;
a substantially vertical upper extension member coupled to the yoke, wherein the vertical upper extension member has a positive buoyancy element at its distal end and has an axis passing through a center of the seismic streamer; and
a substantially vertical lower extension member coupled to the yoke, wherein the vertical lower extension member has a negative buoyancy element at its distal end and has an axis passing through the center of the streamer.

11. The apparatus of claim 10 wherein the elongate body portion eccentric to the streamer has a longitudinal axis substantially parallel to a longitudinal axis of the seismic streamer when the elongate body portion is attached thereto.

12. A marine seismic streamer steering apparatus comprising:
an elongate body positioned horizontally eccentric to a marine seismic streamer having a first vertical axis, wherein the elongate body has a second vertical axis different from the first vertical axis;
two lateral steering control surfaces coupled to the elongate body wherein each of the two control surfaces comprises:
a buoyancy element at their distal ends, the upper buoyancy element comprising a positively buoyant element, the lower buoyancy element comprising a negatively buoyant element; and
a first portion and a second portion, wherein the first portion is disposed substantially vertical along the first vertical axis, wherein the second portion is disposed at an angle from the first portion, and wherein the second portion has a first end connected to the elongate body and a second end connected to the first portion at an inflection point.

13. The apparatus of claim 12 wherein the control surfaces are removably attached to the apparatus.

14. The apparatus of claim 12 wherein the control surfaces each comprise a smoothly curved body having an end connected to the eccentric body portion.

15. The apparatus of claim 12 wherein the second vertical axis is substantially parallel to the first vertical axis when the elongate body is attached to the seismic streamer.

16. The apparatus of claim 12 wherein the lateral steering control surfaces provide a center lift approximately through the first vertical axis.

17. A marine seismic streamer steering apparatus comprising:
an elongate body positioned horizontally eccentric to a marine seismic streamer having a first vertical axis, wherein the elongate body has a second vertical axis different from the first vertical axis;
two lateral steering control surfaces coupled to the elongate body, each control surface having a first portion and a second portion, wherein the first portion is disposed substantially vertical along the first vertical axis, wherein the second portion is disposed at an angle from the first portion, and wherein the second portion has a first end coupled to the elongate body and a second end coupled to the first portion at an inflection point, wherein the first portion provides a center of lift approximately along the first vertical axis; and
two substantially vertical extensions extending from the streamer, wherein the vertical extensions are offset from the first portions of the control surfaces.

18. The apparatus of claim 17 wherein the second vertical axis is substantially parallel to the first vertical axis when the elongate body is attached the seismic streamer.

* * * * *